United States Patent
Shimizu et al.

(10) Patent No.: US 10,250,413 B2
(45) Date of Patent: Apr. 2, 2019

(54) FACILITY SYSTEM

(71) Applicant: JTEKT CORPORATION, Osaka-shi (JP)

(72) Inventors: Yoshinobu Shimizu, Sakai (JP); Toshio Aono, Chiryu (JP)

(73) Assignee: JTEKT CORPORATION, Osaka-shi (JP)

( * ) Notice: Subject to any disclaimer, the term of this patent is extended or adjusted under 35 U.S.C. 154(b) by 81 days.

(21) Appl. No.: 15/492,118

(22) Filed: Apr. 20, 2017

(65) Prior Publication Data
US 2017/0310502 A1    Oct. 26, 2017

(30) Foreign Application Priority Data

Apr. 26, 2016    (JP) ................. 2016-088506

(51) Int. Cl.
*G06F 15/177*    (2006.01)
*H04L 12/66*    (2006.01)
*H04M 1/725*    (2006.01)
*H04L 29/08*    (2006.01)

(52) U.S. Cl.
CPC .............. *H04L 12/66* (2013.01); *H04L 67/00* (2013.01); *H04M 1/72519* (2013.01); *Y02P 90/02* (2015.11); *Y02P 90/30* (2015.11)

(58) Field of Classification Search
CPC .... H04L 12/66; H04L 67/00; H04M 1/72519; Y02P 90/02; Y02P 90/30
USPC ........................................................ 709/220
See application file for complete search history.

(56) References Cited

U.S. PATENT DOCUMENTS

| | | | |
|---|---|---|---|
| 6,760,782 B1 * | 7/2004 | Swales .................... | H04L 12/66 709/218 |
| 7,742,833 B1 * | 6/2010 | Herbst ............... | G05B 23/0264 700/108 |
| 2017/0302624 A1 * | 10/2017 | Persson ............... | H04L 12/4633 |

* cited by examiner

*Primary Examiner* — Phuoc H Nguyen
(74) *Attorney, Agent, or Firm* — Oblon, McClelland, Maier & Neustadt, L.L.P.

(57) ABSTRACT

In a facility system, a first gateway PLC connected to first processing machines and second gateway PLCs connected to second processing machines are connected to an upper-level network. Further, the first gateway PLC and the second gateway PLCs control operation mutually associated between the first processing machines and the second processing machines on the basis of mutually associated information which is acquired from the first processing machines and the second processing machines.

7 Claims, 2 Drawing Sheets

FACILITY SYSTEM

INCORPORATION BY REFERENCE

The disclosure of Japanese Patent Application No. 2016-088506 filed on Apr. 26, 2016 including the specification, drawings and abstract, is incorporated herein by reference in its entirety.

BACKGROUND OF THE INVENTION

1. Field of the Invention

The present invention relates to a facility system.

2. Description of the Related Art

Japanese Patent Application Publication No. 5-127712 (JP 5-127712 A) describes a device in which a plurality of processing machines include respective programmable logic controllers (PLCs), and the PLCs are connected to each other through a network. The PLC performs control (independent control) of operation of the processing machine alone, and performs control (mutual control, e.g. interlock control) of operation based on the relationship with another processing machine. That is, the PLC which is mounted on the processing machine is connected to the PLC which is mounted on another processing machine through the network.

An industrial network for use in facilities that include a plurality of processing machines is generally formed as a network that is unique to each company. Examples of the industrial network include PROFINET (registered trademark), MECHATROLINK (registered trademark), CC-Link (registered trademark), EtherCAT (registered trademark), and SERCOS (registered trademark). In the related art, a particular type of network is selected as the industrial network which connects between the plurality of PLCs. That is, different industrial networks are not connected to each other.

Multiple types of production lines are occasionally installed in a factory. In such a case, a plurality of processing machines that constitute an individual production line are connected to each other through an industrial network of the same type. However, processing machines that constitute different production lines use different types of networks, and therefore are not connected to each other.

Standalone gateways that connect different industrial networks to each other have been developed in recent years. This gateway can transmit and receive I/O data between two industrial networks. This gateway also operates as a slave for a CC-Link network, for example, and has a function as an I/O device for PROFINET on a PROFINET network. Use of this gateway allows mutual processing by connecting processing machines that constitute different production lines to each other.

In order to perform mutual control of a plurality of processing machines connected to each other through different networks, it is necessary to change the settings of respective PLCs mounted on the processing machines. However, the PLCs include information (programs and various data) for performing independent control in addition to information (programs and various data) for performing mutual control as described above. Therefore, it is not easy to change the settings of the PLCs. That is, the settings of the PLCs cannot be changed by anyone but a worker that also grasps the settings for performing independent control for the processing machines.

SUMMARY OF THE INVENTION

It is an object of the present invention to provide a facility system in which a variety of types of processing machines on different networks are connected to each other and settings for performing mutual control of processing machines connected to different networks can be made easily.

An aspect of the present invention provides a facility system including: a first processing machine and a second processing machine that each include a machine body and a control device that controls operation of the machine body; a first lower-level network and a second lower-level network connected to the first processing machine and the second processing machine, respectively; a first gateway programmable logic controller (PLC) connected to the first processing machine via the first lower-level network; a second gateway PLC connected to the second processing machine via the second lower-level network; and an upper-level network that connects between the first gateway PLC and the second gateway PLC.

The control device controls operation that is executable by the machine body alone. The first gateway PLC is a gateway that connects between the first lower-level network and the upper-level network and the second gateway PLC is a gateway that connects between the second lower-level network and the upper-level network. The first gateway PLC and the second gateway PLC control operation mutually associated between the first processing machine and the second processing machine on the basis of mutually associated information acquired from the first processing machine and the second processing machine.

In the facility system according to the aspect described above, the first gateway PLC is connected to the first processing machine through the first lower-level network, and connected to the second gateway PLC through the upper-level network. The second gateway PLC is also connected in a similar manner. Even if the first lower-level network, the second lower-level network, and the upper-level network are of different types, information can be transmitted and received between the first processing machine and the second processing machine through the first gateway PLC and the second gateway PLC.

Further, the first gateway PLC and the second gateway PLC are each not a simple gateway, but control mutually associated operation on the basis of the mutually associated information which is acquired from the first processing machine and the second processing machine. The control device of each of the processing machines does not control operation mutually associated with the other processing machine, but controls operation that is executable by the processing machine itself alone. That is, it is not necessary for the control device of the individual processing machine to make settings with the other processing machine. It is only necessary that the first gateway PLC and the second gateway PLC should make settings for operation mutually associated between the processing machines. That is, by only making settings for the first gateway PLC and the second gateway PLC, different networks can be connected to each other, and further, settings for performing mutual control of the processing machines which are connected to the networks can also be made easily.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
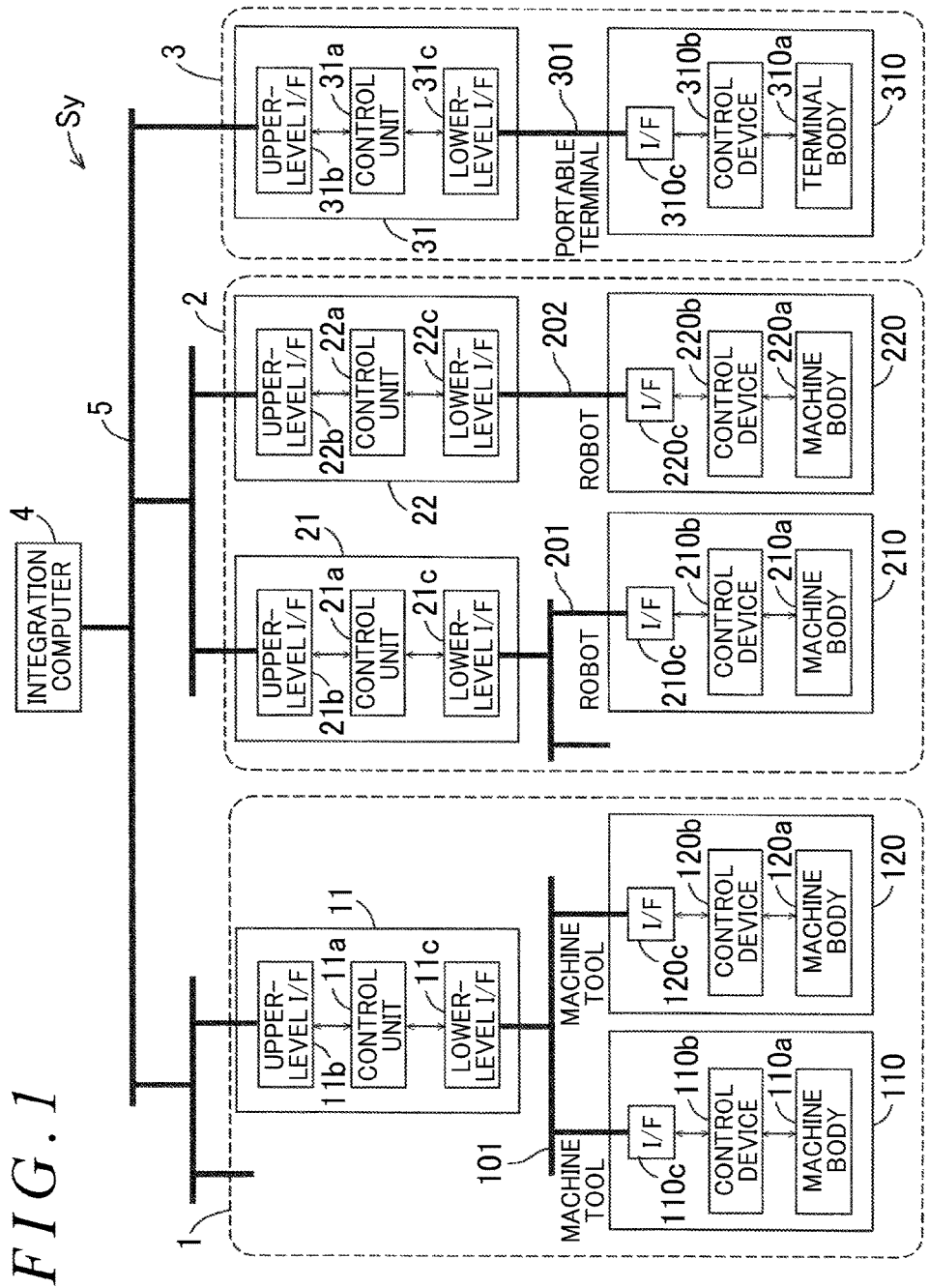
FIG. 1 illustrates the overall configuration of a facility system.

The overall configuration of a facility system Sy according to an embodiment of the present invention will be described with reference to FIG. 1. Herein, a production factory is described as an example of the facility system Sy. However, the present invention is also applicable to facilities other than the production factory.

In a first example, the facility system Sy includes one production line. The facility system Sy includes a first network unit 1 that includes first processing machines 110 and 120, a second network unit 2 that includes second processing machines 210 and 220, a third network unit 3 that includes a work instruction device 310, an integration computer 4, and an upper-level network 5.

The first network unit 1, the second network unit 2, and the third network unit 3 are connected to each other through the upper-level network 5, and further connected to the integration computer 4 via the upper-level network 5.

The first network unit 1 includes a plurality of first processing machines 110 and 120 which are machine tools, a first lower-level network 101, and a first gateway PLC 11. The first processing machine 110, 120 includes a first machine body 110a, 120a, a first control device 110b, 120b that controls operation of the first machine body 110a, 120a, and a first interface 110c, 120c that is connectable to an external device.

The first control device 110b, 120b controls operation that is executable by the first machine body 110a, 120a alone. The first control device 110b, 120b is, for example, constituted of a numerical control device for the first machine body 110a, 120a, a PLC (a PLC that is different in configuration from the first gateway PLC 11) that controls operation of the first machine body 110a, 120a alone, and so forth.

The first lower-level network 101 is connected to the first interfaces 110c and 120c of the first processing machines 110 and 120. The first lower-level network 101 may be a wired communication network or a wireless communication network. Normally, a prescribed network type that matches the manufacturer of the machine tools is used for the machine tools which constitute the first processing machines 110 and 120. Thus, the first lower-level network 101 is of a network type that is connectable to the first processing machines 110 and 120.

The first gateway PLC 11 is connected to the first processing machines 110 and 120 via the first lower-level network 101. The first gateway PLC 11 is also connected to the upper-level network 5. That is, the first gateway PLC 11 is a gateway that connects between the first lower-level network 101 and the upper-level network 5.

The first gateway PLC 11 includes a control unit 11a, an upper-level interface 11b, and a lower-level interface 11c. The lower-level interface 11c is connected to the first lower-level network 101. The upper-level interface 11b is connected to the upper-level network 5. The control unit 11a not only demonstrates the function as a gateway, but also performs control (such as interlock control, for example) of operation mutually associated with the second processing machines 210 and 220. That is, the control unit 11a has the function of a control unit as a gateway and of a control unit of the PLC.

Further, the control unit 11a executes a forecast analysis of a maintenance timing for the first processing machines 110 and 120 or a life end timing of a constituent part. That is, the first gateway PLC 11 is connected to the first processing machines 110 and 120 via the first lower-level network 101, and therefore functions as a server for edge computing or fog computing that enables processing in a region that is very close to the first processing machines 110 and 120 to be addressed. The edge computing and the fog computing are used for contrast with cloud computing.

The second network unit 2 includes a plurality of second processing machines 210 and 220 which are robots that carry in and out a workpiece between the first processing machines 110 and 120. The second network unit 2 further includes second lower-level networks 201 and 202 and second gateway PLCs 21 and 22. The second network unit 2 is substantially the same in configuration as the first network unit 1.

The second processing machine 210, 220 includes a second machine body 210a, 220a, a second control device 210b, 220b that controls operation of the second machine body 210a, 220a, and a second interface 210c, 220c that is connectable to an external device. The second control device 210b, 220b controls operation that is executable by the second machine body 210a, 220a alone.

The second lower-level network 201, 202 is connected to the second interface 210c, 220c of the second processing machine 210, 220. The second lower-level network 201, 202 is of a network type that is connectable to the second processing machine 210, 220. The first processing machines 110 and 120 and the second processing machines 210 and 220 are produced by different manufacturers, and therefore the first interfaces 110c and 120c and the second interfaces 210c and 220c are normally of different types. Therefore, the first lower-level network 101 and the second lower-level networks 201 and 202 are of different types.

The second gateway PLCs 21 and 22 are substantially the same in configuration as the first gateway PLC 11. The second gateway PLC 21, 22 is connected to the second processing machine 210, 220 via the second lower-level network 201, 202. The second gateway PLCs 21 and 22 are also connected to the upper-level network 5. That is, the second gateway PLC 21, 22 is a gateway that connects between the second lower-level network 201, 202 and the upper-level network 5.

The second gateway PLC 21, 22 includes a control unit 21a, 22a, an upper-level interface 21b, 22b, and a lower-level interface 21c, 22c. The lower-level interface 21c, 22c is connected to the second lower-level network 201, 202. The upper-level interfaces 21b and 22b are connected to the upper-level network 5.

The control unit 21a, 22a not only demonstrates the function as a gateway, but also performs control (such as interlock control, for example) of operation mutually associated with the first processing machines 110 and 120. That is, the control unit 21a, 22a has the function of a control unit as a gateway and of a control unit of the PLC. In addition, the control unit 21a, 22a executes a forecast analysis of a maintenance timing for the second processing machine 210, 220 or a life end timing of a constituent part.

The upper-level interfaces 21b and 22b of the second gateway PLCs 21 and 22 are the same as the upper-level interface 11b of the first gateway PLC 11. On the other hand, it is only necessary that the lower-level interfaces 21c and 22c of the second gateway PLCs 21 and 22 should correspond to the second lower-level networks 201 and 202, and the lower-level interfaces 21c and 22c may be of types that are different from that of the lower-level interface 11c of the first gateway PLC 11.

The third network unit 3 includes the work instruction device 310 to which a working state can be input by a worker and which displays the next work for the worker. The third network unit 3 further includes a third lower-level network 301 and a third gateway PLC 31.

The work instruction device 310 is a portable terminal that can be carried along by the worker in the embodiment, but may be a stationary terminal that has been installed. The portable terminal may be any of a handy type and a mounted type. Examples of the handy type include non-mounted devices such as tablets, cellular phones, and smartphones. Examples of the mounted type include an arm band type, a glasses type, an earphone type, a helmet mount type, and so forth. The work instruction device 310 includes a terminal body 310a, a third control device 310b that controls operation of the terminal body 310a, and a third interface 310c that is connectable to an external device. The terminal body 310a may be a touch panel that includes a display function and an input function, a component that has a display unit and an input unit separately, or the like. The worker executes work in accordance with the next work displayed on the terminal body 310a.

The third control device 310b performs a process for transmitting information input to the terminal body 310a (e.g. the working state of the worker) to the outside via the third interface 310c, and a process for displaying information acquired via the third interface 310c (the next work for the worker) on the terminal body 310a.

The third lower-level network 301 is connected to the third interface 310c of the work instruction device 310. The third lower-level network 301 is of a network type that is connectable to the work instruction device 310. In the case where the work instruction device 310 is a terminal that can be carried along by the worker, the third lower-level network 301 is a network that enables wireless communication. It should be noted, however, that the third lower-level network 301 may be a network that enables wired communication in the case where the work instruction device 310 is stationary.

The work instruction device 310 is produced by a manufacturer that is different from those of the first processing machines 110 and 120 and the second processing machines 210 and 220, and therefore the third interface 310c is normally of a type that is different from those of the first interfaces 110c and 120c and the second interfaces 210c and 220c. Therefore, the third lower-level network 301 is of a type that is different from those of the first lower-level network 101 and the second lower-level networks 201 and 202.

The third gateway PLC 31 is connected to the work instruction device 310 via the third lower-level network 301. The third gateway PLC 31 is also connected to the upper-level network 5. That is, the third gateway PLC 31 is a gateway that connects between the third lower-level network 301 and the upper-level network 5.

The third gateway PLC 31 includes a control unit 31a, an upper-level interface 31b, and a lower-level interface 31c. The lower-level interface 31c is connected to the third lower-level network 301. The upper-level interface 31b is connected to the upper-level network 5.

The control unit 31a not only demonstrates the function as a gateway, but also performs control of operation mutually associated with the first processing machines 110 and 120 and the second processing machines 210 and 220. The control unit 31a functions as a management device that performs process management. The control unit 31a grasps the status of processes performed by the first processing machines 110 and 120 and processes performed by the second processing machines 210 and 220 and the status of works performed by the worker for the first processing machines 110 and 120 and the second processing machines 210 and 220 on the basis of process planning that prescribes the order of execution of the processes and the works. In this way, the control unit 31a manages processes performed by the first processing machines 110 and 120 and processes performed by the second processing machines 210 and 220 and works performed by the worker for the first processing machines 110 and 120 and the second processing machines 210 and 220.

Specifically, the control unit 31a acquires information about the state of processes performed by the first processing machines 110 and 120 via the first gateway PLC 11, and acquires information about the state of processes performed by the second processing machines 210 and 220 via the second gateway PLCs 21 and 22. Further, the control unit 31a receives information about the working state of the worker (information about the work completion state during work) from the work instruction device 310.

Then, the control unit 31a decides the next work for the worker on the basis of the information on the state of processes and the information on the working state of the worker. Subsequently, the control unit 31a transmits the decided next work to the work instruction device 310 via the lower-level interface 31c. Then, the next work transmitted from the control unit 31a is displayed on the terminal body 310a of the work instruction device 310.

The upper-level interface 31b of the third gateway PLC 31 is the same as the upper-level interface 11b of the first gateway PLC 11 and the upper-level interfaces 21b and 22b of the second gateway PLCs 21 and 22. On the other hand, it is only necessary that the lower-level interface 31c of the third gateway PLC 31 should correspond to the third lower-level network 301, and the lower-level interface 31c may be of a type that is different from those of the lower-level interface 11c of the first gateway PLC 11 and the lower-level interfaces 21c and 22c of the second gateway PLCs 21 and 22.

The upper-level network 5 is connected to the upper-level interface 11b of the first gateway PLC 11, the upper-level interfaces 21b and 22b of the second gateway PLCs 21 and 22, and the upper-level interface 31b of the third gateway PLC 31. The upper-level network 5 is of the same type as the upper-level interfaces 11b, 21b, 22b, and 31b, and therefore is connectable thereto. That is, the upper-level network 5 is not restricted by the network type as long as the upper-level network 5 corresponds to the upper-level interfaces 11b, 21b, 22b, and 31b. That is, the upper-level network 5 may be of the same type as any of the first lower-level network 101, the second lower-level networks 201 and 202, and the third lower-level network 301, and may be of a type that is different from those of all of such networks.

The integration computer 4 is connected to the upper-level network 5. The integration computer 4 acquires information on the first processing machines 110 and 120 via the first gateway PLC 11, acquires information on the second processing machines 210 and 220 via the second gateway PLCs 21 and 22, and acquires information on the work instruction device 310 via the third gateway PLC 31.

The integration computer 4 executes an integration process for the first processing machines 110 and 120 and the second processing machines 210 and 220 on the basis of the acquired information. For example, the integration computer 4 can analyze information mutually associated with the first processing machines 110 and 120 and the second processing machines 210 and 220. The integration computer 4 can return the analysis result to the first gateway PLC 11 and the second gateway PLCs 21 and 22, and can also return the analysis result to the first processing machines 110 and 120 and the second processing machines 210 and 220 via the first gateway PLC 11 and the second gateway PLCs 21 and 22.

The integration computer 4 can also analyze the management of work for the worker at the third gateway PLC 31 on the basis of the acquired information in consideration of the analysis result of the first processing machines 110 and 120 and the second processing machines 210 and 220 described above.

That is, the integration computer 4 can function as a host computer that performs an integration process for all the connected devices, can function as a server for cloud computing, and can function as an analysis device that utilizes cloud computing.

The first gateway PLC 11, the second gateway PLCs 21 and 22, and the third gateway PLC 31 (hereinafter referred to as the "gateway PLCs 11, 21, 22, and 31") are configured to have a common mechanical configuration. The gateway PLCs 11, 21, 22, and 31 are devices that are independent of the first processing machines 110 and 120, the second processing machines 210 and 220, and the work instruction device 310, and therefore are not restrained in design as long as the gateway PLCs 11, 21, 22, and 31 are connectable to the devices 110, 120, 210, 220, and 310.

It should be noted, however, that it is necessary that the lower-level interfaces 11c, 21c, 22c, and 31c should be interfaces that correspond, in specifications, to the lower-level interfaces 110c, 120c, 210c, 220c, and 310c which are connected thereto via the lower-level networks 101, 201, 202, and 301. Thus, the lower-level interfaces 11c, 21c, 22c, and 31c of the gateway PLCs 11, 21, 22, and 31 are provided so as to be replaceable.

In addition, the upper-level interfaces 11b, 21b, 22b, and 31b of the gateway PLCs 11, 21, 22, and 31 are interfaces of the same specifications. Further, it is necessary that the upper-level interfaces 11b, 21b, 22b, and 31b should be interfaces that correspond, in specifications, to the interface of the integration computer 4. Thus, the upper-level interfaces 11b, 21b, 22b, and 31b of the gateway PLCs 11, 21, 22, and 31 are also provided so as to be replaceable.

Thus, the gateway PLC 11, 21, 22, 31 includes a removable board that has the upper-level interface 11b, 21b, 22b, 31b, a removable board that has the lower-level interface 11c, 21c, 22c, 31c, and a board that has the control unit 11a, 21a, 22a, 31a.

Figure 2:
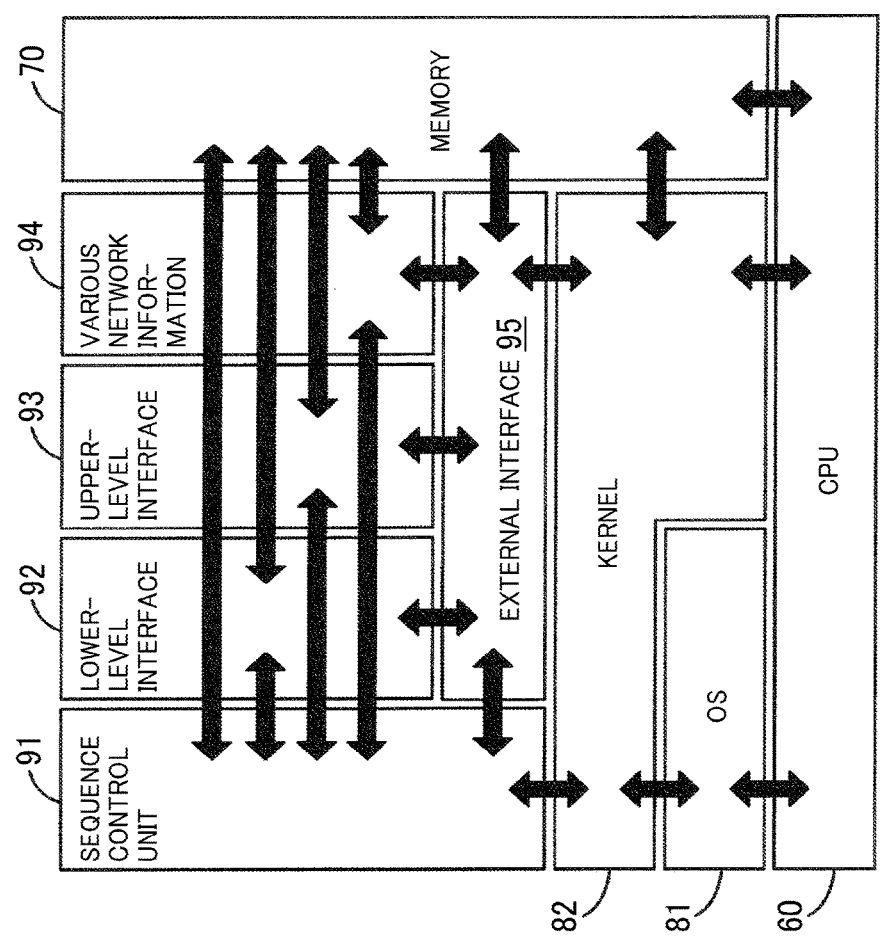
FIG. 2 illustrates the configuration of a control unit of a gateway PLC.

Next, the configuration of the control unit 11a, 21a, 22a, 31a of the gateway PLC 11, 21, 22, 31 will be described with reference to FIG. 2. As illustrated in FIG. 2, the control unit 11a, 21a, 22a, 31a includes a CPU 60, a memory 70, and software 81 to 82 and 91 to 95.

An operating system (OS) 81 and a kernel 82 are provided as basic software. The OS 81 and the kernel 82 have a role of connecting between hardware and applications, and manages operation of the applications, the overall system, and so forth. A sequence control unit 91, a lower-level interface application 92, an upper-level interface application 93, a various network information storage unit 94, and an external interface application 95 are provided as application software. The arrows in FIG. 2 indicate the flow of information between the units. That is, the units which constitute the control units 11a, 21a, 22a, and 31a can transmit and receive signals.

The sequence control unit 91 which is a piece of the application software corresponds to a portion that functions as the PLCs. That is, the sequence control unit 91 controls mutually associated operation of the first processing machines 110 and 120, the second processing machines 210 and 220, and the work instruction device 310. For example, the sequence control unit 91 performs interlock control, etc. The sequence control unit 91 further executes a forecast analysis of a maintenance timing for the processing machines 110, 120, 210, and 220 or a life end timing of a constituent part.

The lower-level interface application 92 is an application for causing the lower-level interfaces 11c, 21c, 22c, and 31c to operate. The upper-level interface application 93 is an application for causing the upper-level interfaces 11b, 21b, 22b, and 31b to operate. These interface applications 92 and 93 execute corresponding network software.

The various network information storage unit 94 stores network information corresponding to the lower-level interfaces 11c, 21c, 22c, and 31c and the upper-level interfaces 11b, 21b, 22b, and 31b. That is, the lower-level interface application 92 and the upper-level interface application 93 operate using the network information which is stored in the various network information storage unit 94. The various network information storage unit 94 includes network information on PROFINET (registered trademark), MECHATROLINK (registered trademark), CC-Link (registered trademark), EtherCAT (registered trademark), SERCOS (registered trademark), and so forth. That is, the lower-level interface application 92 and the upper-level interface application 93 are operable even if the lower-level interfaces 11c, 21c, 22c, and 31c and the upper-level interfaces 11b, 21b, 22b, and 31b are of any of the network types described above.

The external interface application 95 is an application that causes an external interface (not illustrated) for connection with an external memory or an external device to operate. The external interface is provided to the gateway PLCs 11, 21, 22, and 31. Examples of the external interface include a USB port, video input and output terminals, audio input and output terminals, and a memory card slot.

That is, the lower-level interface application 92, the upper-level interface application 93, the various network information storage unit 94, and the external interface application 95 correspond to a portion that functions as a gateway.

In the embodiment described above, one production line is included in the production factory. Besides, the production factory may include a plurality of production lines. For example, it is assumed that a first production line constituted of the first network unit 1 is a production line in which parts are to be machined, and a second production line constituted of the second network unit 2 is a production line in which units are to be assembled. The first production line includes the plurality of first processing machines 110 and 120 which are machine tools. The second production line includes the plurality of second processing machines 210 and 220 which are robots for assembly. The present invention is also applicable to this case in the same manner as described above.

The facility system Sy according to the embodiment includes the first processing machines 110 and 120 and the second processing machines 210 and 220 which include the machine bodies 110a, 120a, 210a, and 220a and the control devices 110b, 120b, 210b, and 220b which control operation of the machine bodies 110a, 120a, 210a, and 220a. The facility system Sy further includes the first lower-level network 101 and the second lower-level networks 201 and 202 which are connected to the first processing machines 110 and 120 and the second processing machines 210 and 220, the first gateway PLC 11 which is connected to the first processing machines 110 and 120 via the first lower-level network 101, the second gateway PLCs 21 and 22 which are connected to the second processing machines 210 and 220 via the second lower-level networks 201 and 202, and the upper-level network 5 which connects between the first gateway PLC 11 and the second gateway PLCs 21 and 22.

The control devices 110b, 120b, 210b, 220b control operation that is executable by the machine bodies 110a, 120a, 210a, 220a alone. The first gateway PLC 11 and the second gateway PLCs 21, 22 are each a gateway that connects between the first lower-level network 101 and the second lower-level networks 201 and 202 and the upper-level network 5. Further, the first gateway PLC 11 and the second gateway PLCs 21 and 22 control operation mutually associated between the first processing machines 110 and 120 and the second processing machines 210 and 220 on the basis of the mutually associated information which is acquired from the first processing machines 110 and 120 and the second processing machines 210 and 220.

In the facility system Sy, the first gateway PLC 11 is connected to the first processing machines 110 and 120 through the first lower-level network 101, and connected to the second gateway PLCs 21 and 22 through the upper-level network 5. The second gateway PLCs 21 and 22 are also connected in a similar manner. Even if the first lower-level network 101, the second lower-level networks 201 and 202, and the upper-level network 5 are of different types, information can be transmitted and received between the first processing machines 110 and 120 and the second processing machines 210 and 220 through the first gateway PLC 11 and the second gateway PLCs 21 and 22.

Further, the first gateway PLC 11 and the second gateway PLCs 21 and 22 are each not a simple gateway, but control mutually associated operation, such as interlock control, on the basis of the mutually associated information which is acquired from the first processing machines 110 and 120 and the second processing machines 210 and 220. The control device 110b, 120b, 210b, 220b of the processing machine 110, 120, 210, 220 does not control operation mutually associated with the other processing machine 110, 120, 210, 220, but controls operation that is executable by the processing machine 110, 120, 210, 220 itself alone.

That is, it is not necessary that the control device 110b, 120b, 210b, 220b of the processing machine 110, 120, 210, 220 should make settings with the other processing machine 110, 120, 210, 220. It is only necessary that the first gateway PLC 11 and the second gateway PLCs 21 and 22 should make settings for operation mutually associated with the processing machines 110, 120, 210, and 220. That is, by only making settings for the first gateway PLC 11 and the second gateway PLCs 21 and 22, different networks can be connected to each other, and further, settings for performing mutual control of the processing machines 110, 120, 210, and 220 which are connected to the networks can also be made easily.

In addition, the first gateway PLC 11 executes a forecast analysis of a maintenance timing for the first processing machines 110 and 120 or a life end timing of a constituent part. The function to perform a forecast analysis of a maintenance timing for the first processing machines 110 and 120 or a life end timing is borne by the first gateway PLC 11. Settings for the control devices 110b and 120b of the first processing machines 110 and 120 and the first gateway PLC 11 can also be made easily by unbundling such an analysis function from the control devices 110b and 120b. Further, the first gateway PLC 11 is connected to the first processing machines 110 and 120 via the first lower-level network 101, and can directly acquire information via the first lower-level network 101. Thus, the first gateway PLC 11 can also acquire a large amount of information from the first processing machines 110 and 120. As a result, the first gateway PLC 11 can perform a forecast analysis accurately. This also applies to the second gateway PLCs 21 and 22.

In addition, the facility system Sy includes the integration computer 4. The integration computer 4 is connected to the upper-level network 5, and acquires information on the first processing machines 110 and 120 and the second processing machines 210 and 220 via the first gateway PLC 11 and the second gateway PLCs 21 and 22. Further, the integration computer 4 executes an integration process for the first processing machines 110 and 120 and the second processing machines 210 and 220 on the basis of the acquired information.

The integration computer 4 may be configured to be connectable to the upper-level network 5. Thus, the integration computer 4 can be set easily for the first processing machines 110 and 120 which are connected to the first lower-level network 101 and the second processing machines 210 and 220 which are connected to the second lower-level networks 201 and 202 which are of a network type that is different from that of the first lower-level network 101. That is, an integration process can be performed easily using the integration computer 4.

In addition, the facility system Sy includes the work instruction device 310, to which the working state of the worker can be input by the worker and which displays the next work for the worker, the third lower-level network 301 which is connected to the work instruction device 310, and the third gateway PLC 31 which is connected to the first gateway PLC 11 and the second gateway PLCs 21 and 22 via the upper-level network 5.

The third gateway PLC 31 is a gateway that connects between the third lower-level network 301 and the upper-level network 5. Further, the third gateway PLC 31 manages a process performed by the first processing machines 110 and 120 and the second processing machines 210 and 220 which are connected via the first gateway PLC 11 and the second gateway PLCs 21 and 22, and work performed by the worker for the first processing machines 110 and 120 and the second processing machines 210 and 220. Further, the third gateway PLC 31 decides the next work for the worker on the basis of the working state of the worker which is received from the work instruction device 310, and transmits the decided next work to the work instruction device 310. In this way, the work instruction device 310 can be configured similarly to the first processing machines 110 and 120 and the second processing machines 210 and 220 to constitute a part of the facility system Sy. Further, the facility system Sy which includes the work instruction device 310 can be set easily by setting the third gateway PLC 31 so as to have a function of managing work instructions for the worker.

The work instruction device 310 may be a portable terminal that can be carried along by the worker. In this case, the third lower-level network 301 enables wireless communication. The facility system Sy can be set easily by also adopting such a network configuration. In addition, the workability for the worker is improved.

In the first gateway PLC 11, the lower-level interface 11c which is connected to the first lower-level network 101 is provided so as to be replaceable, and the upper-level interface 11b which is connected to the upper-level network 5 is provided so as to be replaceable. The first gateway PLC 11 includes network software that is compatible with a plurality of types of network and to which the first lower-level network 101 and the upper-level network 5 are applicable, and executes network software that matches the lower-level interface 11c and the upper-level interface 11b which are connected thereto. When the first gateway PLC 11 is configured as described above, the first gateway PLC 11 can be used for general purposes. Thus, the first gateway PLC 11 can be set easily. This also applies to the second gateway PLCs 21 and 22.

In the third gateway PLC 31, further, the lower-level interface 31c which is connected to the third lower-level network 301 is provided so as to be replaceable, and the upper-level interface 31b which is connected to the upper-level network 5 is provided so as to be replaceable. The third gateway PLC 31 includes network software that is compatible with a plurality of types of network and to which the third lower-level network 301 and the upper-level network 5 are applicable, and executes network software that matches the lower-level interface 31c and the upper-level interface 31b which are connected thereto. The third gateway PLC 31 can also be used for general purposes. Further, the third gateway PLC 31 can be configured in the same manner as the first gateway PLC 11 and the second gateway PLCs 21 and 22. Thus, the gateway PLCs 11, 21, 22, and 31 can be set very easily.

What is claimed is:

1. A facility system comprising:
    a first processing machine and a second processing machine that each include a machine body and a control device that controls operation of the machine body;
    a first lower-level network and a second lower-level network connected to the first processing machine and the second processing machine, respectively;
    a first gateway programmable logic controller connected to the first processing machine via the first lower-level network;
    a second gateway programmable logic controller connected to the second processing machine via the second lower-level network; and
    an upper-level network that connects between the first gateway programmable logic controller and the second gateway programmable logic controller, wherein:
    the control device controls operation that is executable by the machine body alone; and
    the first gateway programmable logic controller is a gateway that connects between the first lower-level network and the upper-level network and the second gateway programmable logic controller is a gateway that connects between the second lower-level network and the upper-level network, and
    the first gateway programmable logic controller and the second gateway programmable logic controller control operation mutually associated between the first processing machine and the second processing machine on the basis of mutually associated information acquired from the first processing machine and the second processing machine.

2. The facility system according to claim 1, wherein the first gateway programmable logic controller executes a forecast analysis of a maintenance timing for the first processing machine or a life end timing of a constituent part.

3. The facility system according to claim 1, further comprising:
    an integration computer connected to the upper-level network, the integration computer acquiring information on the first processing machine and the second processing machine via the first gateway programmable logic controller and the second gateway programmable logic controller and executing an integration process for the first processing machine and the second processing machine on the basis of the acquired information.

4. The facility system according to claim 1, further comprising:
    a work instruction device to which a working state of a worker is input by the worker and which displays next work for the worker;
    a third lower-level network connected to the work instruction device; and
    a third gateway programmable logic controller connected to the first gateway programmable logic controller and the second gateway programmable logic controller via the upper-level network, wherein:
    the third gateway programmable logic controller
        is a gateway that connects between the third lower-level network and the upper-level network,
        manages a process performed by the first processing machine and the second processing machine which are connected via the first gateway programmable logic controller and the second gateway programmable logic controller, and work performed by the worker for the first processing machine and the second processing machine,
        decides the next work for the worker on the basis of the working state of the worker which is received from the work instruction device, and
        transmits the decided next work to the work instruction device.

5. The facility system according to claim 4, wherein:
    the work instruction device is a portable terminal that is carried along by the worker; and
    the third lower-level network enables wireless communication.

6. The facility system according to claim 1, wherein the first gateway programmable logic controller
    is provided with a lower-level interface connected to the first lower-level network and provided so as to be replaceable,
    is provided with an upper-level interface connected to the upper-level network and provided so as to be replaceable,
    includes network software that is compatible with a plurality of types of network and to which the first lower-level network and the upper-level network is applicable, and
    executes the network software which matches the lower-level interface and the upper-level interface which are connected to the first gateway programmable logic controller.

7. The facility system according to claim 4, wherein:
    the first gateway programmable logic controller
        is provided with a lower-level interface connected to the first lower-level network and provided so as to be replaceable,
        is provided with an upper-level interface connected to the upper-level network and provided so as to be replaceable, includes network software that is compatible with a plurality of types of network and to which the first lower-level network and the upper-level network is applicable, and executes the network software which matches the lower-level interface and the upper-level interface which are connected to the first gateway programmable logic controller; and the third gateway programmable logic controller is provided with a lower-level interface connected to the third lower-level network and provided so as to be replaceable, is provided with an upper-level interface connected to the upper-level network and provided so as to be replaceable, includes network software that is compatible with a plurality of types of network and to which the third lower-level network and the upper-level network is applicable, and executes the network software which matches the lower-level interface and the upper-level interface which are connected to the third gateway programmable logic controller.

* * * * *